United States Patent
Glacki et al.

(10) Patent No.: US 11,292,744 B2
(45) Date of Patent: Apr. 5, 2022

(54) METHOD FOR PRODUCING A GLASS ARTICLE

(71) Applicant: SCHOTT AG, Mainz (DE)

(72) Inventors: Alexander Glacki, Mainz (DE); Inka Henze, Nieder-Olm (DE); Doris Moseler, Budenheim (DE); Ulrike Stohr, Mainz (DE); Heike Brack, Budenheim (DE)

(73) Assignee: SCHOTT AG, Mainz (DE)

( * ) Notice: Subject to any disclaimer, the term of this patent is extended or adjusted under 35 U.S.C. 154(b) by 4 days.

(21) Appl. No.: 16/886,886

(22) Filed: May 29, 2020

(65) Prior Publication Data

US 2020/0308047 A1 Oct. 1, 2020

Related U.S. Application Data

(63) Continuation of application No. PCT/EP2018/081299, filed on Nov. 15, 2018.

(30) Foreign Application Priority Data

Nov. 30, 2017 (DE) .................... 10 2017 128 413.3

(51) Int. Cl.
C03C 23/00 (2006.01)
(52) U.S. Cl.
CPC .................................. C03C 23/007 (2013.01)
(58) Field of Classification Search
CPC .................................................. C03C 23/007
See application file for complete search history.

(56) References Cited

U.S. PATENT DOCUMENTS

| | | | |
|---|---|---|---|
| 2,377,062 A | 5/1945 | Adams | |
| 3,797,567 A * | 3/1974 | Wolf | C03B 25/06 165/120 |
| 6,280,849 B1 | 8/2001 | Miwa | |
| 2012/0277085 A1 | 11/2012 | Bookbinder | |
| 2013/0171456 A1 | 7/2013 | Fadeev | |

(Continued)

FOREIGN PATENT DOCUMENTS

| | | |
|---|---|---|
| CN | 104271346 | 1/2015 |
| DE | 102006013820 | 9/2007 |
| WO | 2011029857 | 3/2011 |

OTHER PUBLICATIONS

International search report dated Feb. 14, 2019 for corresponding PCT Application PCT/EP2018/08129.

(Continued)

*Primary Examiner* — Cynthia Szewczyk
(74) *Attorney, Agent, or Firm* — Ohlandt, Greeley, Ruggiero & Perle, L.L.P.

(57) ABSTRACT

A process for producing a glass article is provided that includes, in order, a first process step in which a surface of the glass article has a temperature of at least 400° C. for at least some of the time, a second process step in which the surface of the glass article has a temperature of more than 10° C. and less than 100° C. and the surface is brought into contact with water or water vapor and the surface of the glass article is supplied with an amount of water which corresponds to a water layer thickness of from 1 to 100 μm, and a third process step in which the glass article is processed further with contact of the surface with foreign materials or other glass articles.

20 Claims, 1 Drawing Sheet

(56) References Cited

U.S. PATENT DOCUMENTS

2017/0008797 A1  1/2017 Wagner
2018/0105449 A1* 4/2018 Wada ...................... C03B 29/02

OTHER PUBLICATIONS

English translation of Written Opinion dated Feb. 22, 2019 for corresponding PCT Application PCTEP2018/08129, 5 pages.
English translation of International Preliminary Report on Patentability dated Jun. 11, 2020 for corresponding PCT Application PCTEP2018/08129, 8 pages.

* cited by examiner

METHOD FOR PRODUCING A GLASS ARTICLE

CROSS REFERENCE TO RELATED APPLICATIONS

This application is a continuation of International Application PCT/EP2018/081299 filed Nov. 15, 2018, which claims benefit under 35 USC § 119 of German Application No. 10 2017 128 413.3 filed Nov. 30, 2017, the entire contents of all of which are incorporated herein by reference.

BACKGROUND

1. Field of the Invention

The invention relates to a process for producing a glass article.

2. Description of Related Art

Surfaces of freshly molded glass articles are dull because of high surface energies and are therefore highly susceptible to surface defects such as scratches, cracks, fractures and checks. Furthermore, freshly molded glass articles tend to stick, i.e. they adhere slightly to one another. The dull surface can lead to damage to the surface, for example scratches, occurring during further processing of the glass articles, which can then also lead to increased glass breakage and thus also to glass particle formation and particulate contamination of the glass articles produced.

In the container glass industry, hot-end and cold-end coatings are therefore frequently used in order to make the glass surface less sensitive to damage. Here, a coating comprising foreign substances which can include metal oxides and organic compounds such as wax emulsions is applied to the glass. However, such hot-end and cold-end coatings do not come into question for the production of pharmaceutical primary packaging because of the introduced impurities of the glass articles.

As an alternative, fresh glass products are stored for a period of from at least ten days to a number of months, during which time a saturated surface which is significantly less sensitive to damage to the surface is increasingly formed. The risk of fracture, scratches and damage to the material in further-processing operations such as washing, printing or coating processes is reduced thereby.

In the manufacture of pharmaceutical primary packaging made of glass, in particular, adverse effects occur both on the glass product and also during its production process as a result of the sensitivity of the glass surface after hot shaping. If the products are processed further without intermediate storage, i.e. without natural saturation of the glass surface, defects can occur as a result of glass-glass contact, i.e., for example, contact with further glass articles of the same type, or contact of the glass with tools, grabbers, supports or conveyor belts. When products are stored for a long time, their sensitivity decreases but a largely undefined organic coating, which is undesirable for pharmaceuticals, is formed on the product surface. The natural saturation of the glass surface is, however, highly time- and environment-dependent. Thus, saturation of the glass surface generally takes significantly longer in the case of storage at low temperatures than at higher temperatures. In addition, the intermediate storage of a glass product before further processing represents a large logistical outlay.

Washing processes in which a glass article is supplied with large amounts of water and/or further chemicals can also change the surface of glass articles so as to reduce the coefficient of sliding friction $\mu$. However, washing processes likewise incur high manufacturing costs and cannot be limited to the exterior surface of a glass article without considerable additional expense. In washing processes for containers, there is therefore fundamentally the risk of contamination of the exterior surface, but in particular also the risk of contamination of the interior surface. In particular, however, every washing process brings about a chemical change in the glass surface; in particular, alkali metals such as sodium and potassium, and also lithium if it is present in the glass, are washed out in a known manner.

SUMMARY

It is therefore an object of the present invention to provide a process for producing glass articles in which surface defects such as scratches and in particular glass fracture are largely avoided and, in addition, intermediate storage or a washing process of the glass articles should be avoided. Furthermore, the glass articles should also not come into contact with or be contaminated by inorganic, organic foreign materials or glass particles in the process. Finally, all changes in the glass article which could have adverse effects on its utility as pharmaceutical primary packaging should be ruled out.

The process of the invention for producing a glass article comprises, in this order, a first process step A in which a surface of the glass article has a temperature of at least 400° C. for at least some of the time, a second process step B in which the surface of the glass article has a temperature of more than 5° C. and less than 100° C. and the surface is brought into contact with water or water vapor and the surface of the glass article is supplied with an amount of water which corresponds to a water layer thickness of from 1 to 100 µm and a third process step C in which the glass article is processed further with contact of the surface with foreign materials or other glass articles. It has surprisingly been found that the surface of a glass article which has previously been heated to a temperature of 400° C. for at least some of the time can be changed by brief contact with water or water vapor so that the sensitivity of the surface can be significantly reduced. The tendency of the glass articles to formation of scratches, cracks and adhesion to one another is significantly reduced.

The glass article can be a glass article of any shape, e.g. hollow glass, plate glass, or else glass in ingot, tube or rod form.

The first process step A can be any process in which the glass surface is briefly brought to a temperature of at least about 400° C. It can be, for example, a cooling process for annealing, as is carried out in the production of most glass articles, or else a thermal prestressing process. It can likewise be a shaping process in which the glass article is initially shaped from a melt or is reshaped from an intermediate such as a glass tube.

In the second process step B, at least the surface to be treated of the glass article has a temperature in the range from 5° C. to 100° C. The surface is brought into contact with a small amount of water in liquid and/or gaseous form, with the amount of water being set so that, based on the liquid aggregate state, it corresponds to a layer thickness of from 1 to 100 µm on the surface to be treated of the glass article. Which surface the glass article to be treated has and which proportion of the water reaches the surface of the glass article as a function of the selected method of application thus have to be taken into account in determining the total amount of water used. When the water is sprayed onto the surface of the glass article, a typical amount of water used can be, for example, 0.02 nl per cm² of surface area of the glass article, corresponding to occupation of the surface with 20 μm of water.

The third process step C can be a further-processing operation in the most general sense, e.g. a transport process in which the glass article is transported with contact of the surface with foreign materials or other glass articles, a coating process, a packaging process or any type of process which requires contacting of the glass article, e.g. by means of grabbers. It is preferably a cold process in which the surface of the glass article is not brought to above a temperature of from about 200 to 300° C.

As the inventors have discovered, the behavior of the surface which has been treated according to the invention surprisingly differs significantly from a naturally saturated surface. Thus, it is found, as shown in FIG. 1, that the coefficient of sliding friction μ after contacting according to the invention with water or water vapor at a point in time t=0 after the treatment is decreased very greatly, but subsequently increases slightly again over a period of 24 hours, while the coefficient of sliding friction μ simply decreases monotonically in the case of natural saturation of the surface. However, even after 24 hours, the coefficient of sliding friction μ of the glass articles which have been treated according to the invention is still significantly below the coefficient of sliding friction μ of untreated samples. Thus, the further processing of the glass articles should if possible be carried out within 4 hours, preferably within one hour and particularly preferably within less than 10 minutes, after conclusion of the second process step B.

The inventors have also established that the coefficient of sliding friction μ surprisingly correlates with the sensitivity of the glass surface in the event of glass-glass contact.

For glass articles having a cylindrical glass body, for example syringes, vials, cartridges, ampoules, the coefficient of sliding friction μ is measured by fixing a first cylindrical glass body in a horizontal orientation in a defined measurement set-up and rubbing a second cylindrical glass body of the same type, which is arranged horizontally and at right angles to the first cylindrical glass body, at a speed of 10 mm/min and with a constant pressing-on force $F_N$ of 0.5 N over a length of 15 mm over the cylindrical surface of the first cylindrical glass body. During the motion of the second cylindrical glass body, the frictional force $F_R$ is measured. Owing to the cylindrical curvature of the glass surfaces and the tilting of the axes of the two containers relative to one another, the glass articles are in point contact with one another during the measurement. The coefficient of sliding friction is obtained by means of the formula $\mu=F_R/F_N$. It may be pointed out that the coefficient of sliding friction μ of a glass article is always determined relative to a glass article of the same type by means of this measurement method. The measurement method takes particular account of glass articles contacting one another, as is the case in many manufacturing processes. However, the sliding friction of a glass article in contact with other friction partners such as metals, ceramics or plastics correlates with the coefficient of sliding friction μ determined according to the invention and it can be assumed that an increased coefficient of sliding friction μ also leads to increased sliding friction of a glass article in contact with other friction partners such as metals, ceramics or plastics. The coefficient of sliding friction μ for cylindrical syringe bodies made of a type 1b borosilicate glass such as Schott Fiolax® can, for example, be decreased from 0.82 very quickly to 0.42 by means of the process of the invention. Untreated glass syringes having a coefficient of sliding friction μ of 0.82 shortly after they have been produced still have, in contrast, a coefficient of sliding friction μ of 0.75 ten days after they have been produced. Thus, glass syringes produced by the process of the invention can be processed further directly after they have been shaped and heat treated in a cooling oven using the process of the invention without surface defects such as scratches, cracks or fracture occurring.

In addition, the damage which has arisen as a result of the measurement procedure can be analyzed on the first cylindrical glass body which in this procedure is fixed in position.

In a preferred embodiment, the surface of the glass article has a temperature of less than 60° C. in the second process step B. Process step B can be carried out particularly advantageously when the glass article cools down from process step A. When the temperature is about 60° C., the glass article can already be readily brought into contact with water without relatively great vaporization occurring. On the other hand, the glass article still has a very fresh glass surface. This makes uniform treatment of the surface of the glass article possible. At temperatures above 100° C., the surface is no longer sufficiently saturated, as a result of which the desired effect does not occur.

In a preferred embodiment, the surface of the glass article has a temperature of more than 10° C., preferably more than 20° C. and particularly preferably more than 30° C., in the second process step B. The surface of the glass article can, for example, correspond to the ambient temperature. However, preference is given to a temperature above ambient temperature, since the surface of the glass article is more reactive at a higher temperature and excess water evaporates more quickly from the surface of the glass article.

In a preferred embodiment, the third process step C is carried out within 4 hours, preferably within one hour and particularly preferably within less than 10 minutes, after conclusion of the second process step B.

In a preferred embodiment, the contacting of the surface with water occurs over a time of less than 60 s, preferably less than 10 s and particularly preferably from 0.1 s to 2 s. The inventors have established that a very short treatment time of from 0.1 s to 2 s is sufficient to achieve the effect according to the invention. Longer treatment times do not necessarily have an adverse effect, but are generally contradictory to an economical production process with fast cycle times.

In a preferred embodiment, the coefficient of sliding friction μ of the surface before the second process step B has a value $\mu_1$ and directly after the second process step a value $\mu_2$, where: $(\mu_1-\mu_2)/\mu_1>0.1$, preferably $(\mu_1-\mu_2)/\mu_1>0.2$ and more preferably $(\mu_1-\mu_2)/\mu_1>0.3$. Here, "directly after the second process step B" means that, after the contacting with water or water vapor, at least a drying-off of the surface occurs and the coefficient of sliding friction μ is then measured. Likewise, cooling of the glass article to less than about 30° C. or to room temperature can be awaited. The measurement of the coefficient of sliding friction μ directly after the second process step B thus typically occurs from 1 minute to 15 minutes after the process step B. For syringe bodies made of type I borosilicate glass of the brand Schott Fiolax®, for example, a value $(\mu_1-\mu_2)/\mu_1=0.48$ was achieved, i.e. approximately a halving of the coefficient of sliding friction μ.

In a further preferred embodiment, the coefficient of sliding friction μ of the surface before the second process step B has a value of $\mu_1 > 0.7$ and directly after the second process step B has a value of $\mu_2 < 0.5$. If the coefficient of sliding friction is above 0.6-0.7, the glass articles have a high sensitivity to scratching, while, surprisingly, at values of the coefficient of sliding friction below 0.5, virtually no mutual surface defects are observed on glass-glass contact.

In a preferred embodiment, the chemical change in the glass article after the second process step B is limited to a surface layer having a thickness of <50 nm, preferably <10 nm. The process of the invention is thus characterized in that the glass article is chemically changed only in an extremely thin surface layer. This is achieved, in particular, by the low temperatures of the glass surface on being brought into contact with water or water vapor, and also by the short contact times. Undesirable effects such as diffusion of water into deeper regions of the glass article and leaching of alkali metals from the surface of the glass, as are brought about by water in the case of longer contact times, thus do not occur.

In a preferred embodiment, the second process step B does not lead to chemical changes in a layer of the glass article located deeper down, extending from a distance of 50 nm underneath the glass surface into the glass article. Since undesirable effects such as diffusion of water into the interior of the glass and leaching of the interior of the glass do not occur as a result of the second process step, the chemical properties of the interior of the glass are not changed. Undesirable effects of the process of the invention on, for example, subsequent shaping processes can thus be avoided.

In a preferred embodiment, the changes in the surface brought about by the second process step B can be reversed by means of a heat treatment. After a process step as per process step A, in which a surface of the glass article has a temperature of at least 400° C., has been carried out again, the surface properties are thus largely restored to the surface properties of a freshly produced glass surface. A glass surface which has not been saturated and has a high sensitivity and sensitivity to scratching is obtained. The coefficient of sliding friction $\mu$ is increased again. In addition, no residues or contamination introduced by the process step B remain on the glass surface. The process of the invention is thus largely reversible.

In a preferred embodiment, the surface of the glass article is brought into contact exclusively with water or water vapor, preferably with distilled water or WFI (water for injection), in the second process step. Thus, water of very high purity which is in liquid form or as vapor and comprises no additives and no contamination with organic or inorganic materials is used. Thus, for example, water can be used in one of the grades high-purity water, distilled water, WFI. The water more preferably has a conductivity of less than 10 µS, preferably less than 5 µS and particularly preferably less than 0.5 to 0.01 µS. Although a significant reduction in the coefficient of sliding friction is also achieved using conventional mains water in the process of the invention, contamination of the glass surface, e.g. lime deposits or the like, can be avoided in this way.

In a preferred embodiment, an amount of water which corresponds to a water layer thickness of from 5 to 50 µm and preferably from 10 to 30 µm on the surface of the glass article is supplied to the glass article. The inventors have discovered that the amount of water required is surprisingly significantly greater than the thickness of the surface layer which forms on the glass article. The amount of water is thus made available as a function of the surface of the glass article. Optimal lowering of the coefficient of sliding friction $\mu$ was able to be achieved using an amount of water which corresponds to a layer thickness of at least 10 µm. Greater amounts of water have no longer led to a further lowering of the coefficient of sliding friction $\mu$ and merely increase the process time and also the risk of contaminating the glass article or contaminating plant components by excess water and water dripping off from the glass.

In a preferred embodiment, the contacting with water or an air/water mixture is carried out by spraying-on or by means of water vapor with humid, warm air which has a higher temperature than the glass article. Water or an air/water mixture can be sprayed particularly efficiently and in a targeted manner onto the glass article by means of at least one spray nozzle. Here, the nozzle geometry can be matched to the glass article in such a way that the entire surface is very uniformly sprayed. In order to reach the entire surface of the glass article, a plurality of spray nozzles can be arranged around the glass article. Likewise, the glass article can be rotated, preferably around its longitudinal axis, under a spray nozzle, enabling the number of spray nozzles required to be kept small.

Likewise, warm air saturated with water vapor, which preferably has a higher temperature than the glass article so that air impinging on the glass article cools and the water vapor condenses on the glass article, can be supplied to the glass article. The warm air saturated with water vapor can likewise be supplied via a nozzle or else a large-area air flow can be supplied to the glass article. This method is particularly useful when it is not possible to reach the entire surface of the glass article by means of spray nozzles.

In a preferred embodiment, the contacting with water or water vapor is carried out by contacting with atomized water, preferably by means of an ultrasonic atomizer. The atomization of the water by means of an ultrasonic atomizer is characterized by a low energy consumption and little heating of the water, so that a particularly good cooling effect is also achieved in the case of this method of supplying the water. In addition, the water atomized by means of US atomizers can be used more safely and with a lower risk of injury than hot steam in a manufacturing process.

In a preferred embodiment, the glass article is a hollow body, preferably a hollow body composed of a borosilicate glass of type I or type II as per the European Pharmacopeia 8.4, section 3.2.1, or an aluminosilicate glass which has an $Al_2O_3$ content in the range from 8 to 23% by weight. The body can have thermal or chemical mechanical prestressing, as is known for increasing the mechanical strength in the prior art.

In a preferred embodiment, the glass article is a form of pharmaceutical primary packaging, preferably a vial, a syringe, a cartridge or an ampoule. Such pharmaceutical primary packaging has to meet particularly demanding requirements in respect of contamination and cosmetic defects such as scratches and cracks. After dispensing of medicaments into the containers, quality control for particulate contamination, which is made difficult by any cosmetic defects of the pharmaceutical primary packaging and in which cosmetic defects of the pharmaceutical primary packaging can even lead to classification as reject, is generally carried out. The process of the invention is therefore particularly preferably used for producing pharmaceutical primary packaging such as vials, syringes, cartridges or ampoules.

In a preferred embodiment, the foreign materials or other glass articles in the region of contact with the surface of the glass article in the third process step C comprise metal, glass, polymers or ceramic materials. Metals, glass and ceramic materials are particularly critical contact materials for freshly molded glass surfaces because of their high hardness. While damage to the surface regularly occurs in the case of untreated fresh glass surfaces which are brought into contact with metal, glass or ceramic, especially when the contact material likewise has a dull, rough surface, the glass articles which have been treated according to the invention can be contacted by the contact materials without damage to the glass surface at small and routine normal forces as correspond, for example, to the weight of the container. Polymers, on the other hand, represent a smaller risk of surface damage as contact material for a critically molded glass surface, but contact with polymers can lead to abrasion of the polymer and thus also contamination of the surface of the glass article.

The invention will be illustrated in more detail below with the aid of figures and working examples.

DETAILED DESCRIPTION

Syringes were produced from neutral glass tubes of the brand Fiolax®—a type I neutral glass produced by the applicant—having an external diameter of 10.85 mm and a wall thickness of 1.1 mm in a conventional converting process and subsequently heat treated so as to be free of stresses or low in stresses in a cooling oven. The syringes have a cylindrical section in the middle corresponding to the starting tube and a flange at the proximal end and a syringe cone at the distal end. In the heat treatment process, the syringes were heated for about 15 minutes at a temperature of 600° C. and then cooled to room temperature of about 20° C. Some of the syringes were taken off at the end of the cooling belt and the entire surface was sprayed at a temperature of 60° C. with water for injection (WFI). A minimal quantity spray system filled with WFI, which released an amount of water of about 0.02 ml over a spray time of 2 s via an atomizer nozzle, was used for the spraying operation. The syringe was rotated through 360° along the cylinder axis during this time in order to ensure uniform wetting of the entire surface. In this procedure, the syringe was held on a manually operable, rotatable holder which held the syringe body on the interior surface and thus contact of foreign material with the exterior surface was avoided. After brief drying, the coefficient of sliding friction $\mu$ was determined by the method described, with two cylindrical syringe bodies of the same type being rubbed against one another in their cylindrical middle sections at a speed of in each case 10 mm/min and a constant pressing-on force $F_N$ of 0.5 N over a length of 15 mm. The measurement was repeated after 4 hours, 24 hours, 72 hours and 240 hours, with the batch of syringes being stored under normal ambient conditions (20-25° C., 40-60% relative humidity) between the measurements.

For a comparative measurement, some of the glass syringes were not treated with WFI at the end of the cooling belt, with otherwise identical production. In the case of these syringes, the coefficient of sliding friction $\mu$ was determined starting from a point in time t=0 after cooling at the end of the cooling belt after 0 hours and 240 hours.

Figure 1:
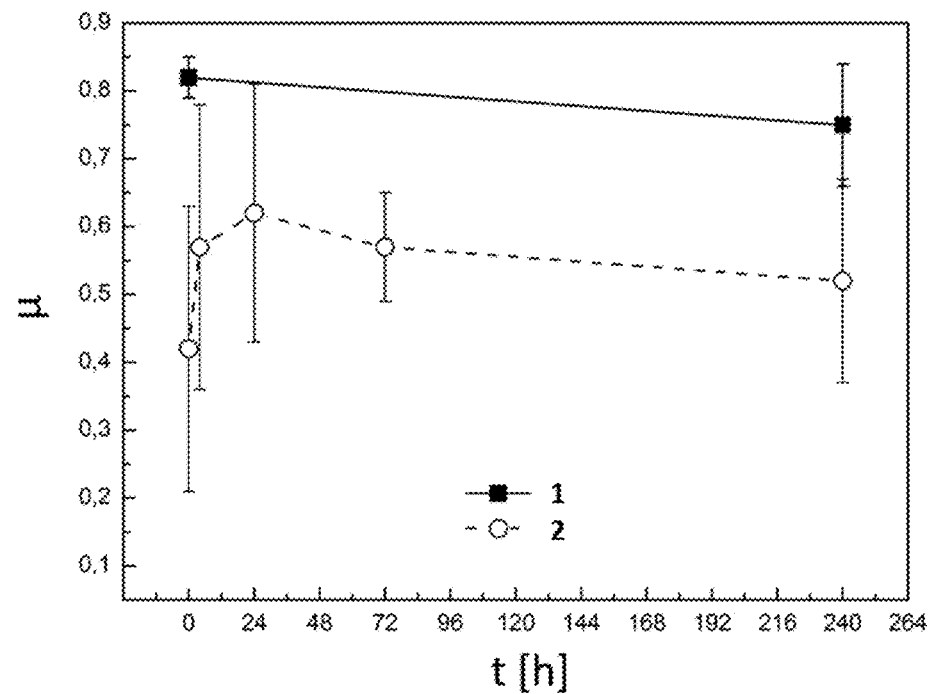
FIG. 1 illustrates a coefficient of sliding friction $\mu$ of two Fiolax® syringes with (curve 2) and without (curve 1) use of the process of the invention.
Figure 2:
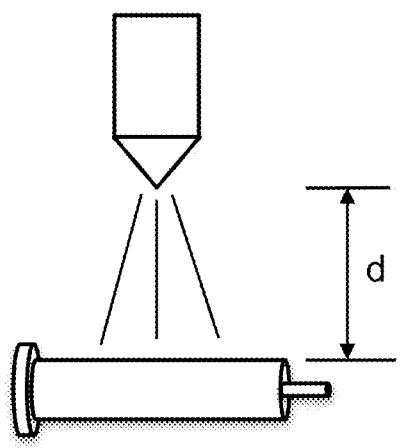
FIG. 2 is a schematic depiction of an apparatus for carrying out the second process step B

The results of the measurements are shown in FIG. 1, with the curve 1 representing the coefficient of sliding friction for the untreated batch of glass syringes and the curve 2 representing the coefficient of sliding friction for the batch treated according to the invention. The untreated syringes have a very high coefficient of sliding friction $\mu$ of 0.82+/−0.03 after the cooling oven, and after 240 hours have a still very high coefficient of sliding friction $\mu$ of 0.75+/−0.09. Both in the case of the 0 hours measurement and in the case of the 240 hours measurement, carrying out the sliding friction measurement led to severe damage to the glass surface in both types of syringes.

The syringes which had been treated according to the invention, on the other hand, had a coefficient of sliding friction of 0.42+/−0.21 directly after the treatment according to the invention, which corresponds to a reduction in the coefficient of sliding friction $\mu$ by about 50% compared to the untreated comparative batch. After 4 hours, 24 hours and 72 hours, too, significantly reduced values of the coefficient of sliding friction $\mu$ were measured. However, it was interestingly found that the coefficients of sliding friction $\mu$ after the treatment according to the invention were once again higher than directly after the treatment according to the invention. It was also conspicuous that the syringes treated according to the invention had virtually no damage to the glass surface resulting from carrying out the sliding friction measurement.

The process of the invention thus significantly improved the sensitive surface of glass syringes in terms of their sliding properties, so that a significant reduction in surface damage occurred on glass-glass contact with syringes of the same type.

In general, it was found that, in the case of the measurement set-up used and the parameters set, scratch formation by glass-glass contact is avoided below the threshold of $\mu$=0.5. This value can therefore be considered to be the desired maximum value for the coefficient of sliding friction.

The process of the invention has numerous advantages.

The high sensitivity of the glass surface to surface damage can be reduced quickly and lastingly. Intermediate storage of syringes after they have been produced can be avoided; the syringes can therefore be processed further directly. The deposition of undefined organics/particles/dust/dirt as a result of intermediate storage is prevented. The weathering and storage conditions (atmospheric humidity, ambient temperature, content of particles in the air, air exchange conditions) no longer have an influence on the surface properties of the products. The reject rate is reduced during further processing and by the definition of a surface state which remains constant. The risk of scratches or fracture of the glass decreases with an accompanying reduced number of particles of the product. No damaging materials or materials which are of concern from a pharmaceutical point of view are brought into contact with the syringe. Owing to the significantly reduced susceptibility of the glass surfaces to scratches, cracks and checks, the formation of glass particles is also reduced. A glass surface which is free of foreign particles is thus ensured.

The reduction in the sliding friction of the glass leads to a significant improvement in the processability on further processing lines, since not only is the risk of cosmetic defects resulting from tool contact reduced but, for example, automated and manual picking-up and smooth transport is also assisted by the low sliding friction resistance.

What is claimed is:

1. A process for producing a glass article, comprising, in this order:

a first process step in which a surface of the glass article has a temperature of at least 400° C. for at least some of the time;

a second process step in which the surface of the glass article has a temperature of more than 5° C. and less than 100° C. and the surface is brought into contact with water or water vapor and the surface of the glass article is supplied with an amount of the water or water vapor that corresponds to a water layer thickness of from 1 to 100 μm; and a third process step in which the glass article is processed further with contact of the surface with foreign materials or other glass articles, wherein the surface has a coefficient of sliding friction before the second process step has a first value ($\mu_1$) and has a second value ($\mu_2$) directly after the second process where ($\mu_1-\mu_2$)/$\mu_1$>0.1.

2. The process of claim 1, wherein the surface of the glass article has a temperature of less than 60° C. in the second process step.

3. The process of claim 1, wherein the second process step is carried out for a period of time of less than 60 s.

4. The process of claim 1, wherein the second process step is carried out for a period of time of less than 10 s.

5. The process of claim 1, wherein the third process step is carried out within 4 hours after conclusion of the second process step.

6. The process of claim 1, wherein the third process step is carried out within 1 hour after conclusion of the second process step.

7. The process of claim 1, where ($\mu_1-\mu_2$)/$\mu_1$>0.3.

8. The process of claim 1, wherein, after the second process step, chemical change induced in the glass article is limited to a surface layer having a thickness of <50 nm.

9. The process of claim 1, wherein, after the second process step, chemical change induced in the glass article is limited to a surface layer having a thickness of <10 nm.

10. The process of claim 1, wherein the second process step does not lead to chemical changes in a layer of the glass article that is located deeper down and extends from a distance of 50 nm underneath the surface of the glass article.

11. The process of claim 1, wherein the second process step induces reversible changes in the surface, the process further comprising reversing the reversible changes in the surface by heat treatment at 400° C.

12. The process of claim 1, wherein the second process step consists of contacting the surface with the water or water vapor.

13. The process of claim 12, wherein the water or water vapor consists of distilled water or water for injection.

14. The process of claim 1, wherein the water layer thickness is from 5 to 50 μm.

15. The process of claim 1, wherein the bringing of the surface into contact with the water or water vapor of the second process step comprises spraying-on humid air that has a higher temperature than the glass article.

16. The process of claim 1, wherein the bringing of the surface into contact with the water or water vapor of the second process step comprises contacting with atomized water.

17. The process of claim 1, wherein the glass article is a hollow body comprising a glass selected from a group consisting of: a type I borosilicate glass according to the European Pharmacopeia 8.4, section 3.2.1; a type II borosilicate glass according to the European Pharmacopeia 8.4, section 3.2.1; and an aluminosilicate glass that has an $Al_2O_3$ content in the range from 8 to 23% by weight.

18. The process of claim 1, wherein the glass article is a pharmaceutical primary packaging selected from a group consisting of a vial, a syringe, a cartridge, and an ampoule.

19. The process of claim 1, wherein the foreign materials or other glass articles are materials selected from a group consisting of metal, glass, polymers, and ceramics.

20. The process of claim 1, wherein the first value ($\mu_1$) is less than 0.7 and the second value ($\mu_2$) is greater than 0.5.

* * * * *